(12) United States Patent
Aase et al.

(10) Patent No.: US 9,065,265 B2
(45) Date of Patent: Jun. 23, 2015

(54) EXTRUDED CABLE STRUCTURES AND SYSTEMS AND METHODS FOR MAKING THE SAME

(75) Inventors: Jonathan Aase, Redwood City, CA (US); Paul Choiniere, Livermore, CA (US); Joseph Briskey, Cupertino, CA (US)

(73) Assignee: APPLE, INC., Cupertino, CA (US)

(*) Notice: Subject to any disclaimer, the term of this patent is extended or adjusted under 35 U.S.C. 154(b) by 384 days.

(21) Appl. No.: 13/013,553

(22) Filed: Jan. 25, 2011

(65) Prior Publication Data
US 2011/0180321 A1 Jul. 28, 2011

Related U.S. Application Data

(60) Provisional application No. 61/298,087, filed on Jan. 25, 2010, provisional application No. 61/384,103, filed on Sep. 17, 2010, provisional application No. 61/319,772, filed on Mar. 31, 2010, provisional application No. 61/384,097, filed on Sep. 17, 2010, provisional application No. 61/326,102, filed on Apr. 20, 2010, provisional application No. 61/349,768, filed on May 28, 2010, provisional application No. 61/378,311, filed on Aug. 30, 2010, provisional application No. 61/378,314, filed on Aug. 30, 2010.

(51) Int. Cl.
| | |
|---|---|
| B29C 47/02 | (2006.01) |
| B29C 47/22 | (2006.01) |
| H02G 15/18 | (2006.01) |
| B29C 39/42 | (2006.01) |
| B29C 43/18 | (2006.01) |
| B29C 43/20 | (2006.01) |
| B29C 43/36 | (2006.01) |
| B29C 45/14 | (2006.01) |
| B29C 33/10 | (2006.01) |
| B29K 105/00 | (2006.01) |
| B29K 705/00 | (2006.01) |
| B29L 31/34 | (2006.01) |

(52) U.S. Cl.
CPC ............ *H02G 15/18* (2013.01); *B29C 33/10* (2013.01); *B29C 39/42* (2013.01); *B29C 43/18* (2013.01); *B29C 43/203* (2013.01); *B29C 43/36* (2013.01); *B29C 2043/3605* (2013.01); *B29C 2043/3621* (2013.01); *B29C 2043/3665* (2013.01); *B29K 2105/256* (2013.01); *B29K 2705/00* (2013.01); *B29L 2031/3462* (2013.01); *B29C 45/14073* (2013.01)

(58) Field of Classification Search
CPC  B29C 45/14073; B29C 39/42; B29C 43/203; B29C 43/36; B29C 47/025; B29C 47/027; B29C 47/124
USPC ............................................. 264/167, 171.16
See application file for complete search history.

(56) References Cited

U.S. PATENT DOCUMENTS

| | | | | | |
|---|---|---|---|---|---|
| 2,149,002 | A | * | 2/1939 | Wermine | 264/171.16 |
| 2,628,998 | A | * | 2/1953 | Frisbie | 174/112 |

(Continued)

*Primary Examiner* — Matthew Daniels
(74) *Attorney, Agent, or Firm* — Brownstein Hyatt Farber Shreck LLP

(57) ABSTRACT

A headset can include a cable structure connecting non-cable components such as jacks and headphones. The cable structure can include several legs connected at a bifurcation. An extrusion process can be used to manufacture legs of a multi-segment cable structure. As material is processed by an extruder, one or more system factors of the extruder can be dynamically adjusted to change a diameter of the resulting leg (e.g., to provide a smooth leg having a changing size). Once the leg is extruded, portions of the leg can be reformed to create undercuts used to connect the legs at a bifurcation region. In some cases, an extrusion process can be used to construct a jointly formed multi-leg cable structure having an integral bifurcation region and split.

11 Claims, 13 Drawing Sheets

(56) References Cited

U.S. PATENT DOCUMENTS

| | | | |
|---|---|---|---|
| 2,937,228 A * | 5/1960 | Robinson | 174/88 C |
| 3,178,770 A * | 4/1965 | Willis | 425/76 |
| 3,752,614 A * | 8/1973 | Bremer | 425/113 |
| 3,758,700 A | 9/1973 | Ditscheid | |
| 3,928,519 A * | 12/1975 | Kashiyama et al. | 264/40.7 |
| 4,110,394 A * | 8/1978 | Shimada et al. | 264/167 |
| 4,385,203 A | 5/1983 | Faranetta et al. | |
| 4,467,002 A | 8/1984 | Crofts | |
| 4,646,872 A * | 3/1987 | Kamon et al. | 181/129 |
| 4,879,807 A * | 11/1989 | Roucaute | 29/828 |
| 4,924,037 A | 5/1990 | Ainsworth et al. | |
| 5,021,611 A * | 6/1991 | Amano | 174/88 R |
| 5,113,039 A | 5/1992 | Guipe et al. | |
| 5,283,392 A * | 2/1994 | Ooshima et al. | 174/84 R |
| 5,397,860 A | 3/1995 | Yochum et al. | |
| 5,563,376 A * | 10/1996 | Hansell et al. | 174/102 R |
| 5,917,155 A | 6/1999 | Hake et al. | |
| 5,945,052 A * | 8/1999 | Schryver et al. | 264/167 |
| 6,050,847 A * | 4/2000 | Kawakami et al. | 439/447 |
| 6,291,770 B1 | 9/2001 | Casperson | |
| 6,392,155 B1 | 5/2002 | Shimizu et al. | |
| 6,644,117 B1 | 11/2003 | Kueck et al. | |
| D526,642 S | 8/2006 | Choe | |
| 7,241,953 B2 | 7/2007 | Glew | |
| D605,628 S | 12/2009 | Ando | |
| 8,249,286 B2 | 8/2012 | Nault | |
| 8,308,505 B2 | 11/2012 | Hatton et al. | |
| 8,363,873 B2 | 1/2013 | Liu et al. | |
| 2002/0017392 A1* | 2/2002 | Efraimsson et al. | 174/110 R |
| 2006/0169473 A1* | 8/2006 | Dobler | 174/73.1 |
| 2007/0020989 A1* | 1/2007 | Liu et al. | 439/447 |
| 2010/0104126 A1 | 4/2010 | Greene | |
| 2011/0044487 A1 | 2/2011 | Nault | |

* cited by examiner

EXTRUDED CABLE STRUCTURES AND SYSTEMS AND METHODS FOR MAKING THE SAME

CROSS-REFERENCE TO RELATED APPLICATION

This application claims the benefit of previously filed U.S. Provisional Patent Application No. 61/298,087, filed Jan. 25, 2010, entitled "Small Diameter Cable with Splitter Assembly," U.S. Provisional Patent Application No. 61/384,103, filed Sep. 17, 2010, entitled "Molded Splitter Structures and Systems and Methods for Making the Same," U.S. Provisional Patent Application No. 61/319,772, filed Mar. 31, 2010, entitled "Thin Audio Plug and Coaxial Routing of Wires," U.S. Provisional Patent Application No. 61/384,097, filed Sep. 17, 2010, entitled "Cable Structures and Systems Including Super-Elastic Rods and Methods for Making the Same," U.S. Provisional Patent Application No. 61/326,102, filed Apr. 20, 2010, entitled "Audio Plug with Core Structural Member and Conductive Rings," U.S. Provisional Patent Application No. 61/349,768, filed May 28, 2010, entitled "Molding an Electrical Cable Having Centered Electrical Wires," U.S. Provisional Patent Application No. 61/378,311, filed Aug. 30, 2010, entitled "Molded Cable Structures and Systems and Methods for Making the Same," and U.S. Provisional Application No. 61/378,314, filed Aug. 30, 2010, entitled "Extruded Cable Structures and Systems and Methods for Making the Same." Each of these provisional applications is incorporated by reference herein in their entireties.

BACKGROUND

Wired headsets are commonly used with many portable electronic devices such as portable music players and mobile phones. Headsets can include non-cable components such as a jack, headphones, and/or a microphone and cables that interconnect the non-cable components. The one or more cables can be manufactured using different approaches

SUMMARY

Extruded cable structures and systems and methods for manufacturing extruded cable structures are disclosed.

A cable structure can interconnect various non-cable components of a headset such as, for example, a plug, headphones, and/or a communications box to provide a headset. The cable structure can include several legs (e.g., a main leg, a left leg, and a right leg) that each connect to a non-cable structure, and each leg may be connected to one another at a bifurcation region (e.g., a region where the main leg appears to split into the left and right legs). Cable structures according to embodiments of this invention provide aesthetically pleasing interface connections between the non-cable components and legs of the cable structure, for example such that the interface connections appear to have been constructed jointly as a single piece, thereby providing a seamless interface.

In addition, because the dimensions of the non-cable components typically have a dimension that is different than the dimensions of a conductor bundle being routed through the legs of the cable structure, one or more legs of the cable structure can have a variable diameter. The change from one dimension to another can exhibit a substantially smooth variation in diameter along the length of the legs of the cable structure.

The interconnection of the three legs at the bifurcation region can vary depending on how the cable structure is manufactured. In one approach, the cable structure can be a single-segment unibody cable structure. In this approach, all three legs are jointly formed, for example using an extrusion process, and no additional processing is required to electrically couple the conductors contained therein. In another approach, the cable structure can be a multi-segment unibody cable structure. In this approach, the legs may be manufactured as discrete segments, but require additional processing to electrically couple conductors contained therein. In some embodiments, the segments can be joined together using a splitter.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1A:
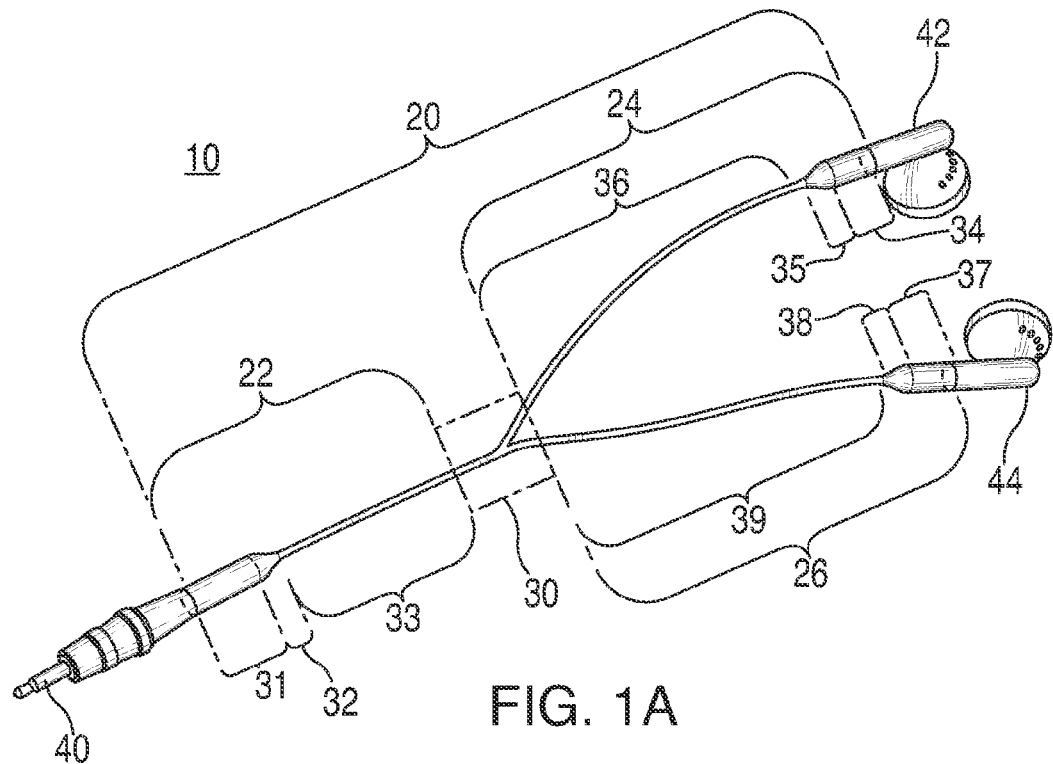
FIGS. 1A and 1B illustrate different headsets having a cable structure that seamlessly integrates with non-cable components in accordance with some embodiments of the invention.

Cable structures for use in headsets are disclosed. The cable structure interconnects various non-cable components of a headset such as, for example, a plug, headphones, and/or a communications box to provide a headset. The cable structure can include multiple legs (e.g., a main leg, a left leg, and a right leg) that each connect to a non-cable component, and each leg may be connected to each other at a bifurcation region (e.g., a region where the main leg appears to split into the left and right legs). Cable structures according to embodiments of this invention provide aesthetically pleasing interface connections between the non-cable components and legs of the cable structure. The interface connections between a leg and a non-cable component are such that they appear to have been constructed jointly as a single piece, thereby providing a seamless interface.

In addition, because the dimensions of the non-cable components typically have a dimension that is different than the dimensions of a conductor bundle being routed through the legs of the cable structure, one or more legs of the cable structure can have a variable diameter. The change from one dimension to another is accomplished in a manner that maintains the spirit of the seamless interface connection between a leg and the non-cable component throughout the length of the leg. That is, each leg of the cable structure exhibits a substantially smooth surface, including the portion of the leg having a varying diameter. In some embodiments, the portion of the leg varying in diameter may be represented mathematically by a bump function, which requires all aspects of the variable diameter transition to be smooth. In other words, a cross-section of the variable diameter portion can show a curve or a curve profile.

The interconnection of the three legs at the bifurcation region can vary depending on how the cable structure is manufactured. In one approach, the cable structure can be a single-segment unibody cable structure. In this approach, all three legs are jointly formed and no additional processing is required to electrically couple the conductors contained therein. Construction of the single-segment cable may be such that the bifurcation region does not require any additional support. If additional support is required, an over-mold can be used to add strain relief to the bifurcation region.

In another approach, the cable structure can be a multi-segment unibody cable structure. In this approach, the legs may be manufactured as discrete segments, but require additional processing to electrically couple conductors contained therein. The segments can be joined together using a splitter. Many different splitter configurations can be used, and the use of some splitters may be based on the manufacturing process used to create the segment.

The cable structure can include a conductor bundle that extends through some or all of the legs. The conductor bundle can include conductors that interconnect various non-cable components. The conductor bundle can also include one or more rods constructed from a superelastic material. The superelastic rods can resist deformation to reduce or prevent tangling of the legs.

The cable structure can be constructed using many different manufacturing processes. The processes include injection molding, compression molding, and extrusion. In injection and compression molding processes, a mold is formed around a conductor bundle or a removable rod. The rod is removed after the mold is formed and a conductor bundle is threaded through the cavity. In extrusion processes, an outer shell is formed around a conductor bundle.

FIG. 1A shows an illustrative headset 10 having cable structure 20 that seamlessly integrates with non-cable components 40, 42, 44. For example, non-cable components 40, 42, and 44 can be a male plug, left headphones, and right headphones, respectively. Cable structure 20 has three legs 22, 24, and 26 joined together at bifurcation region 30. Leg 22 may be referred to herein as main leg 22, and includes the portion of cable structure 20 existing between non-cable component 40 and bifurcation region 30. In particular, main leg 22 includes interface region 31, bump region 32, and non-interface region 33. Leg 24 may be referred to herein as left leg 24, and includes the portion of cable structure 20 existing between non-cable component 42 and bifurcation region 30. Leg 26 may be referred to herein as right leg 26, and includes the portion of cable structure 20 existing between non-cable component 44 and bifurcation region 30. Both left and right legs 24 and 26 include respective interface regions 34 and 37, bump regions 35 and 38, and non-interface regions 36 and 39.

Legs 22, 24, and 26 generally exhibit a smooth surface throughout the entirety of their respective lengths. Each of legs 22, 24, and 26 can vary in diameter, yet still retain the smooth surface.

Non-interface regions 33, 36, and 39 can each have a predetermined diameter and length. The diameter of non-interface region 33 (of main leg 22) may be larger than or the same as the diameters of non-interface regions 36 and 39 (of left leg 24 and right leg 26, respectively). For example, leg 22 may contain a conductor bundle for both left and right legs 24 and 26 and may therefore require a greater diameter to accommodate all conductors. In some embodiments, it is desirable to manufacture non-interface regions 33, 36, and 39 to have the smallest diameter possible, for aesthetic reasons. As a result, the diameter of non-interface regions 33, 36, and 39 can be smaller than the diameter of any non-cable component (e.g., non-cable components 40, 42, and 44) physically connected to the interfacing region. Since it is desirable for cable structure 20 to seamlessly integrate with the non-cable components, the legs may vary in diameter from the non-interfacing region to the interfacing region.

Bump regions 32, 35, and 38 provide a diameter changing transition between interfacing regions 31, 34, and 37 and respective non-interfacing regions 33, 36, and 39. The diameter changing transition can take any suitable shape that exhibits a fluid or smooth transition from any interface region to its respective non-interface region. For example, the shape of the bump region can be similar to that of a cone or a neck of a wine bottle. As another example, the shape of the taper region can be stepless (i.e., there is no abrupt or dramatic step change in diameter, or no sharp angle at an end of the bump region). Bump regions 32, 35, and 38 may be mathematically represented by a bump function, which requires the entire diameter changing transition to be stepless and smooth (e.g., the bump function is continuously differentiable).

Figure 1B:
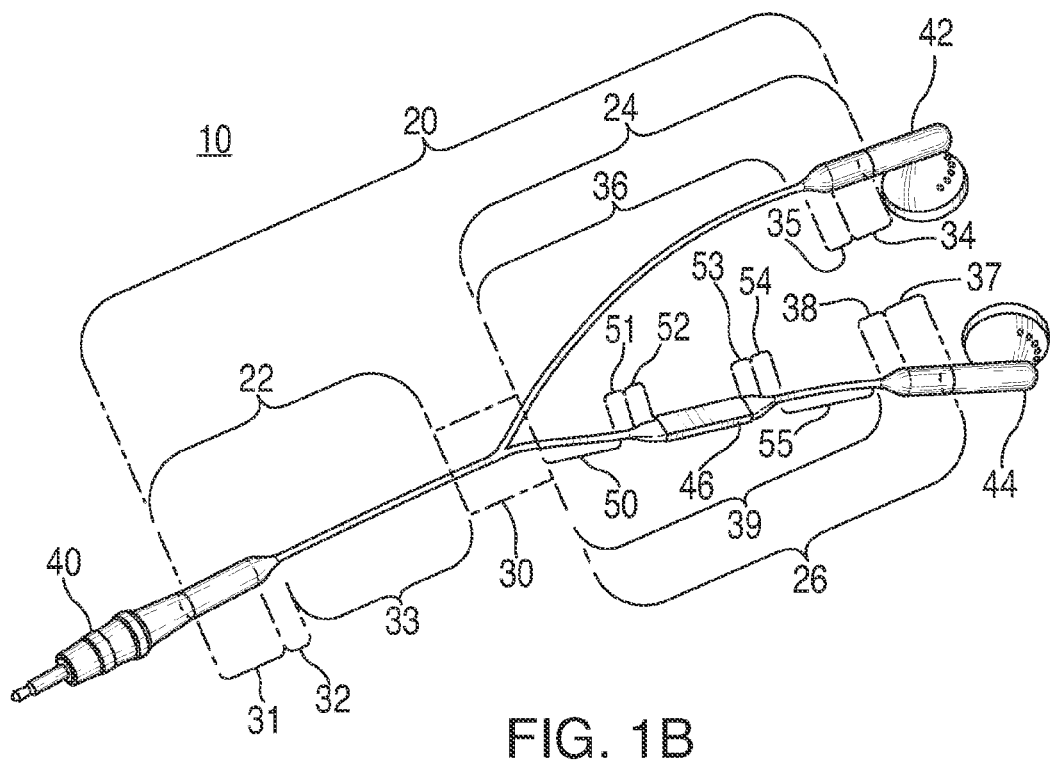
Figure 1C:
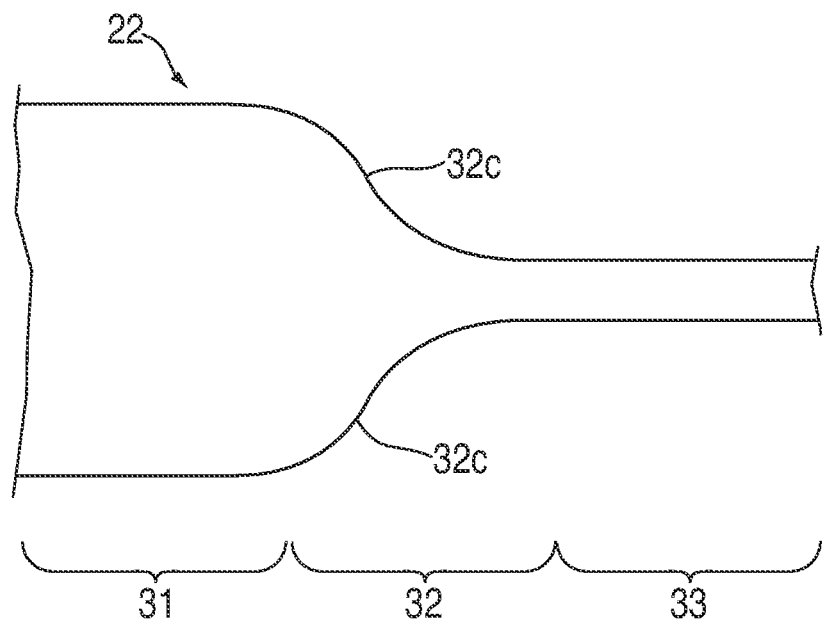
FIGS. 1C and 1D show illustrative cross-sectional views of a portion of a leg in accordance with some embodiments of the invention.
Figure 1D:
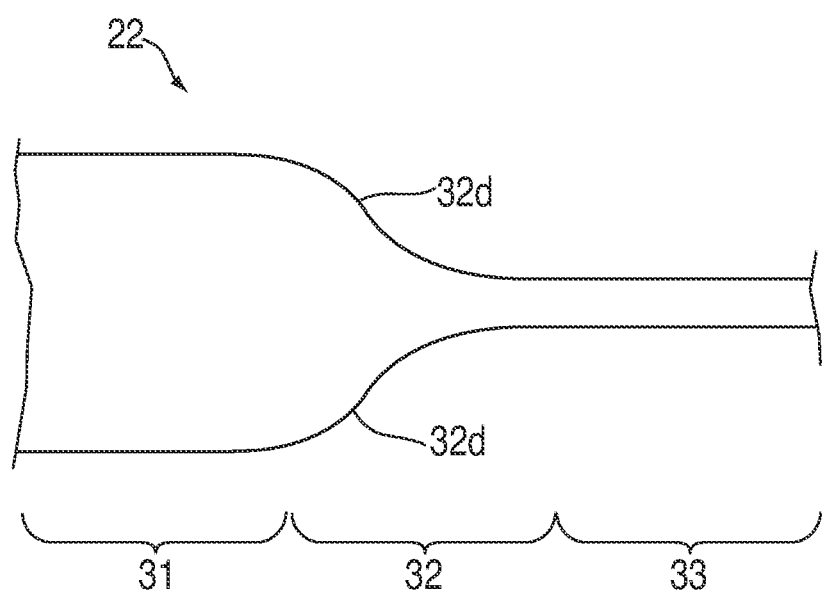
Figure 1E:
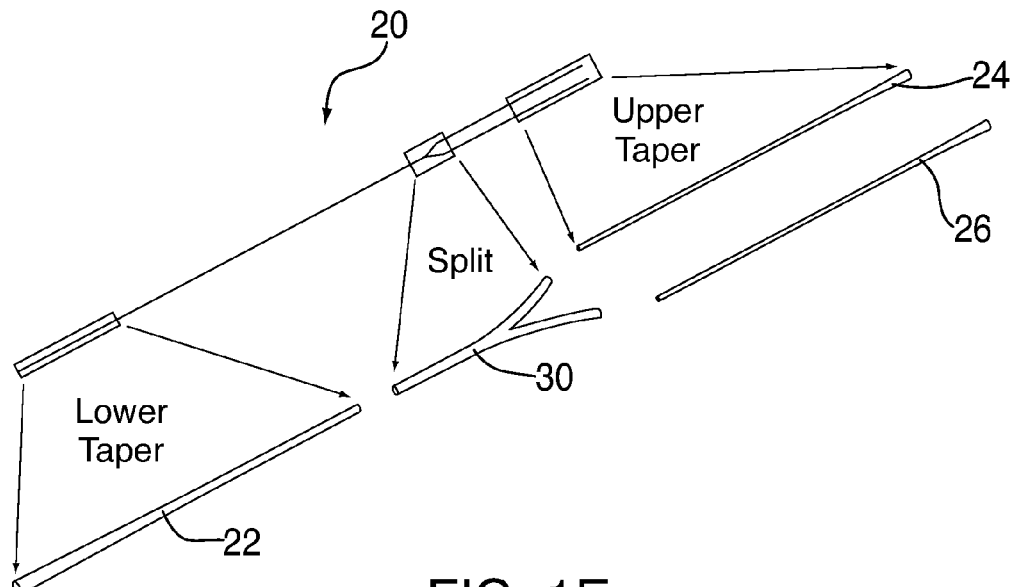
FIG. 1E shows an illustrative headset having a variable diameter in accordance with some embodiments of the invention.

As shown in FIG. 1E, cable structure 20 can include legs 22, 24 and 26 that interface at bifurcation region 30. Each leg can have a varying diameter or shape to provide a cable structure with a smooth outer surface and appealing cosmetic features.

FIGS. 1C and 1D show illustrative cross-sectional views of a portion of main leg 22 in accordance with embodiments of the invention. Both FIGS. 1C and 1D show main leg 22 with a center axis (as indicated by the dashed line) and symmetric curves 32c and 32d. Curves 32c and 32d illustrate that any suitable curve profile may be used in bump region 32. Thus the outer surface of bump region 32 can be any surface that deviates from planarity in a smooth, continuous fashion.

Interface regions 21, 34, and 37 can each have a predetermined diameter and length. The diameter of any interface region can be substantially the same as the diameter of the non-cable component it is physically connected to, to provide an aesthetically pleasing seamless integration. For example, the diameter of interface region 21 can be substantially the same as the diameter of non-cable component 40. In some embodiments, the diameter of a non-cable component (e.g., component 40) and its associated interfacing region (e.g., region 31) are greater than the diameter of the non-interface region (e.g., region 33) they are connected to via the bump region (e.g., region 32). Consequently, in this embodiment, the bump region decreases in diameter from the interface region to the non-interface region.

In another embodiment, the diameter of a non-cable component (e.g., component 40) and its associated interfacing region (e.g., region 31) are less than the diameter of the non-interface region (e.g., region 33) they are connected to via the bump region (e.g., region 32). Consequently, in this embodiment, the bump region increases in diameter from the interface region to the non-interface region.

The combination of the interface and bump regions can provide strain relief for those regions of headset 10. In one embodiment, strain relief may be realized because the interface and bump regions have larger dimensions than the non-interface region and thus are more robust. These larger dimensions may also ensure that non-cable portions are securely connected to cable structure 20. Moreover, the extra girth better enables the interface and bump regions to withstand bend stresses.

The interconnection of legs 22, 24, and 26 at bifurcation region 30 can vary depending on how cable structure 20 is manufactured. In one approach, cable structure 20 can be a jointly formed multi-leg or single-segment unibody cable structure. In this approach all three legs are manufactured jointly as one continuous structure and no additional processing is required to electrically couple the conductors contained therein. That is, none of the legs are spliced to interconnect conductors at bifurcation region 30, nor are the legs manufactured separately and then later joined together. Some jointly formed multi-leg cable structures may have a top half and a bottom half, which are molded together and extend throughout the entire cable structure. For example, such jointly formed multi-leg cable structures can be manufactured using injection molding and compression molding manufacturing processes. Thus, although a mold-derived jointly formed multi-leg cable structure has two components (i.e., the top and bottom halves), it is considered a jointly formed multi-leg cable structure for the purposes of this disclosure. Other jointly formed multi-leg cable structures may exhibit a contiguous ring of material that extends throughout the entire cable structure. For example, such a jointly formed multi-leg cable structure can be manufactured using an extrusion process (discussed below in more detail).

In another approach, cable structure 20 can be a multi-segment unibody cable structure in which three discrete or independently formed legs are connected at a bifurcation region. A multi-segment unibody cable structure may have the same appearance of the jointly formed multi-leg cable structure, but the legs are manufactured as discrete components. The legs and any conductors contained therein are interconnected at bifurcation region 30. The legs can be manufactured, for example, using any of the processes used to manufacture the jointly formed multi-leg cable structure.

The cosmetics of bifurcation region 30 can be any suitable shape. In one embodiment, bifurcation region 30 can be an overmold structure that encapsulates a portion of each leg 22, 24, and 26. The overmold structure can be visually and tactically distinct from legs 22, 24, and 26. The overmold structure can be applied to the single or multi-segment unibody cable structure. In another embodiment, bifurcation region 30 can be a two-shot injection molded splitter having the same dimensions as the portion of the legs being joined together. Thus, when the legs are joined together with the splitter mold, cable structure 20 maintains its unibody aesthetics. That is, a multi-segment cable structure has the look and feel of jointly formed multi-leg cable structure even though it has three discretely manufactured legs joined together at bifurcation region 30. Many different splitter configurations can be used, and the use of some splitters may be based on the manufacturing process used to create the segment.

Cable structure 20 can include a conductor bundle that extends through some or all of legs 22, 24, and 26. Cable structure 20 can include conductors for carrying signals from non-cable component 40 to non-cable components 42 and 44. Cable structure 20 can include one or more rods constructed from a superelastic material. The rods can resist deformation to reduce or prevent tangling of the legs. The rods are different than the conductors used to convey signals from non-cable component 40 to non-cable components 42 and 44, but share the same space within cable structure 20. Several different rod arrangements may be included in cable structure 20.

In yet another embodiment, one or more of legs 22, 24, and 26 can vary in diameter in two or more bump regions. For example, the leg 22 can include bump region 32 and another bump region (not shown) that exists at leg/bifurcation region 30. This other bump region may vary the diameter of leg 22 so that it changes in size to match the diameter of cable structure at bifurcation region 30. This other bump region can provide additional strain relief. Each leg can have any suitable diameter including, for example, a diameter in the range of 0.4 mm to 1 mm (e.g., 0.8 mm for leg 20, and 0.6 mm for legs 22 and 24).

In some embodiments, another non-cable component can be incorporated into either left leg 24 or right leg 26. As shown in FIG. 1B, headset 60 shows that non-cable component 46 is integrated within leg 26, and not at an end of a leg like non-cable components 40, 42 and 44. For example, non-cable component 46 can be a communications box that includes a microphone and a user interface (e.g., one or more mechanical or capacitive buttons). Non-cable component 46 can be electrically coupled to non-cable component 40, for example, to transfer signals between communications box 46 and one or more of non-cable components 40, 42 and 44.

Non-cable component 46 can be incorporated in non-interface region 39 of leg 26. In some cases, non-cable component 46 can have a larger size or girth than the non-interface regions of leg 26, which can cause a discontinuity at an interface between non-interface region 39 and communications box 46. To ensure that the cable maintains a seamless unibody appearance, non-interface region 39 can be replaced by first non-interface region 50, first bump region 51, first interface region 52, communications box 46, second interface region 53, second bump region 54, and second non-interface region 55.

Similar to the bump regions described above in connection with the cable structure of FIG. 1A, bump regions 51 and 54 can handle the transition from non-cable component 46 to non-interface regions 50 and 55. The transition in the bump region can take any suitable shape that exhibits a fluid or smooth transition from the interface region to the non-interface regions. For example, the shape of the taper region can be similar to that of a cone or a neck of a wine bottle.

Similar to the interface regions described above in connection with the cable structure of FIG. 1A, interface regions 52 and 53 can have a predetermined diameter and length. The diameter of the interface region is substantially the same as the diameter of non-cable component 46 to provide an aesthetically pleasing seamless integration. In addition, and as described above, the combination of the interface and bump regions can provide strain relief for those regions of headset 10.

In some embodiments, non-cable component 46 may be incorporated into a leg such as leg 26 without having bump regions 51 and 54 or interface regions 52 and 53. Thus, in this embodiment, non-interfacing regions 50 and 55 may be directly connected to non-cable component 46.

Cable structures 20 can be constructed using many different manufacturing processes. The processes discussed herein include those that can be used to manufacture the jointly formed multi-leg cable structure or legs for the multi-segment unibody cable structure. In particular, these processes include injection molding, compression molding, and extrusion. Embodiments of this invention use extrusion to manufacture a jointly formed multi-leg cable structure or multi-segment unibody cable structures.

Figure 2:
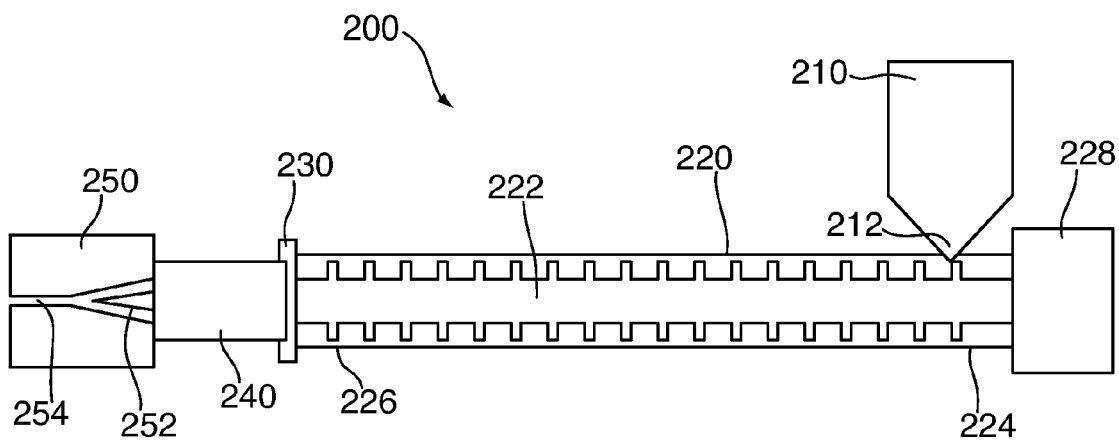
FIG. 2 is a cross-sectional view of an illustrative extruder in accordance with some embodiments of the invention.

In some embodiments, cable structure 20 can be constructed by extruding the main, left and right legs separately, and combining the legs at the bifurcation region. The extrusion process used can be selected such that the interface region, taper region, non-interface region, and bifurcation region of each leg can be constructed seamlessly as part of the extrusion process. Because each region of the leg can have a different diameter (e.g., a different cross-section), the particular extrusion process selected may include controllable system factors for adjusting the dimensions of an extruded leg. FIG. 2 is a cross-sectional view of an illustrative extruder in accordance with some embodiments of the invention. Extruder 200 can receive a material to extrude in a first form, such as pellets, and can transform the material to a form corresponding to cable structure 20.

Extruder 200 can extrude any suitable material to create cable structure 20. For example, the extruder can use one or more of polyethylene, polypropylene, acetal, acrylic, polyamide (e.g., nylon), polystyrene, acrylonitrile butadiene styrene (ABS), and polycarbonate. Material can be provided to extruder 200 in any suitable form including, for example, in liquid or solid form. In one implementation, pellets or chips of material can be provided to hopper 210 for processing. The material can pass through feedthroat 212 and enter barrel 220. Screw 222 can rotate within barrel 220 to direct material from hopper end 224 of the barrel to die end 226 of the barrel. Drive motor 228 can be mechanically connected to screw 222 such that the screw can rotate to direct material received from hopper 210 towards die end 226. The drive motor can drive screw 222 at any suitable rate or speed, including a variable speed based on a manner in which the process is executed.

Barrel 220 can be heated to a desired melt temperature to melt the material provided in hopper 210. For example, barrel 220 can be heated to a temperature in the range of 200° C. to 300° C. (e.g., 250° C.), although the particular temperature can be selected based on the material used. As the material passes through barrel 220, pressure and friction created by screw 222, and heat applied to barrel 220 by a heating component can cause the material to melt and flow. The resulting material can be substantially liquid in a region near die end 226 of barrel 220 so that it may easily flow into die 250. In some cases, different amounts of heat can be applied to different sections of the barrel to create a variable heat profile. In one implementation, the amount of heat provided to barrel 220 can increase from hopper end 224 to die end 226. By gradually increasing the temperature of the barrel, the material deposited in barrel 220 can gradually heat up and melt as it is pushed toward die end 226. This may reduce the risk of overheating, which may cause the material to degrade. In some embodiments, extruder 200 can include cooling components (e.g., a fan) in addition to heating components for controlling a temperature profile of barrel 220.

In some cases, one or more additives can be added to the material within barrel 220 to provide mechanical or finishing attributes to cable structure 20. For example, components for providing UV protection, modifying a coefficient of friction of an outer surface of cable structure 20, refining a color of cable structure 20, or combinations of these can be used. The additives can be provided in hopper 220, or alternatively can be inserted in barrel 220 at another position along the barrel length. The amount of additives added, and the particular position at which additives are added can be selected based on attributes of the material within the barrel. For example, additives can be added when the material reaches a particular fluidity to ensure that the additives can mix with the material.

Screw 222 can have any suitable channel depth and screw angle for directing material towards die 250. In some cases, screw 222 can define several zones each designed to have different effects on the material in barrel 220. For example, screw 222 can include a feed zone adjacent to the hopper and operative to carry solid material pellets to an adjacent melting zone where the solid material melts. The channel depth can progressively increase in the melting zone. Following the melting zone, a metering zone can be used to melt the last particles of material and mix the material to a uniform temperature and composition. Some screws can then include a decompression zone in which the channel depth increases to relieve pressure within the screw and allow trapped gases (e.g., moisture or air) to be drawn out by vacuum. The screw can then include a second metering zone having a lower channel depth to re-pressurize the fluid material and direct it through the die at a constant and predictable rate.

When fluid material reaches die end 226 of barrel 220, the material can be expelled from barrel 220 and can pass through screen 230 having openings sized to allow the material to flow, but preventing contaminants from passing through the screen. The screen can be reinforced by a breaker plate used to resist the pressure of material pushed towards the die by screw 222. In some cases, screen 230, combined with the breaker plate, can serve to provide back pressure to barrel 220 so that the material can melt and mix uniformly within the barrel. The amount of pressure provided can be adjusted by changing the number of screens used, the relative positions of the screens (e.g., mis-aligning openings in stacked screens), or changing the size of openings in a screen.

The material passing through the screen is directed by feedpipe 240 towards die 250. Feedpipe 240 can define an elongated volume through which material can flow. Unlike in barrel 220, in which material rotates through the barrel, material passing through feedpipe 240 can travel along the axis of the feedpipe with little or no rotation. This can ensure that when the material reaches the die, there are no built-in rotational stresses or strains that can adversely affect the resulting cable structure (e.g., stresses that can cause warping upon cooling).

Fluid material passing through feedpipe 240 can reach die 250, where the material is given a profile corresponding to the final conductor structure. Material can pass around pin 252 and through opening 254 of the die. Pin 252 and opening 254 can have any suitable shape including, for example, circular shapes, curved shapes, polygonal shapes, or arbitrary shapes. In some embodiments, pin 252 can be movable within die 250. In some embodiments, elements of die 250 can move such that the size or shape of opening 254 can vary. Once material has passed through the die, the material can be cooled to maintain the extruded shape. The material can be cooled using different approaches including, for example, liquid baths (e.g., a water bath), air cooling, vacuum cooling, or combinations of these.

Figure 3A:
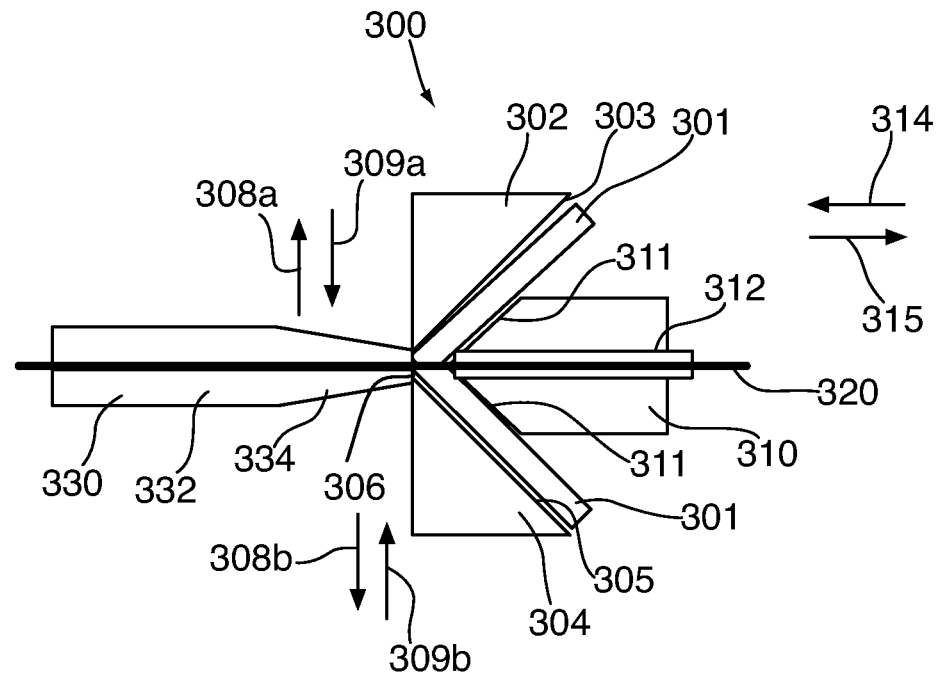
FIGS. 3A and 3B are cross-sectional views of an illustrative die for use in an extrusion process in accordance with some embodiments of the invention.
Figure 3B:
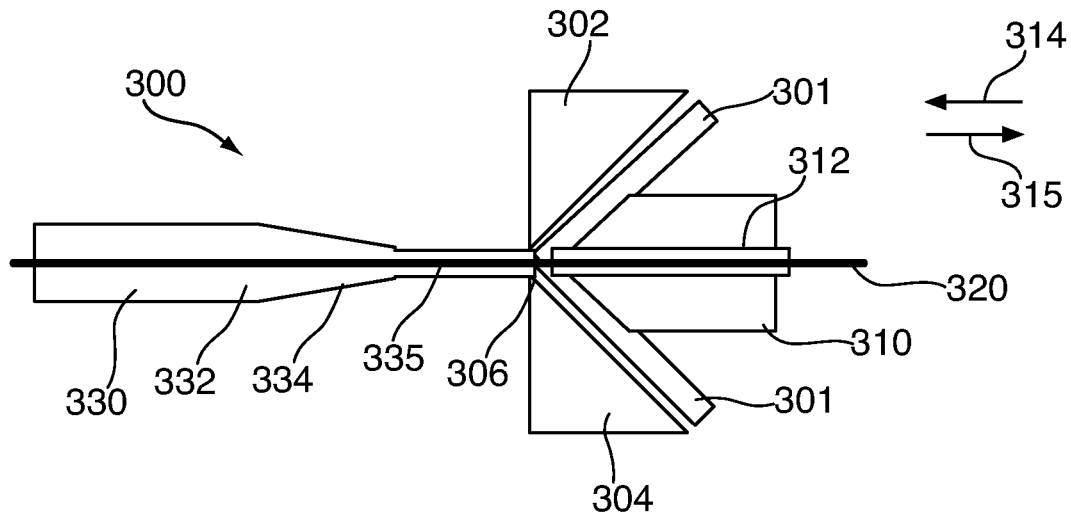

In some embodiments, the die used for extruder 200 can include movable components for adjusting the diameter of material coming out of the die. FIGS. 3A and 3B are cross-sectional views of an illustrative die for use in an extrusion process in accordance with some embodiments of the invention. Die 300 can include top die element 302 and bottom die element 304. In some embodiments, top and bottom die elements 302 and 304 can represent top and bottom halves of a cylindrical die element. Die elements 302 and 304 can include angled surfaces 303 and 305, respectively, for guiding material towards opening 306. In some cases, the angled surfaces can correspond to surfaces of a cone removed from within die elements 302 and 304.

Die 300 can include pin 310 positioned at least partially within an area enclosed by die elements 302 and 304, such that angled surface 311 corresponds to angled surfaces 303 and 305. Material 301 can flow between surface 311 and surfaces 303 and 305 to form a leg 330 of cable structure 20 (FIG. 1). In some embodiments, pin 310 can include hypodermal path 312 extending through pin 310. For example, hypodermal path 312 can extend through a centerline of pin 310. Conductor bundle 320 can be fed through the hypodermal path into the extrusion path (e.g., into a region between die elements 302 and 304 and pin 310) and through opening 306. As conductor bundle 320 is fed through hypodermal path 312, material 301 flowing through the die surrounds conductor bundle 320 as it exits pin 310. The combination of conductor bundle 320 and material 301 forms extruded leg 330. Material 301 forms a continuous sheath or covering that encapsulates conductor bundle 320 and provides both mechanical and cosmetic attributes to the leg 330.

In some cases, material 301 can instead be extruded around a rod that is fed through hypodermal path 312. The rod can have any suitable dimensions including, for example, a constant or variable cross section. The rod can be coated or treated so that it minimally adheres to the extruded material. The rod can be removed from the resulting leg 330 formed by the extrusion process to form a hollow tube through which a conductor bundle can be fed.

Leg 330 can have any suitable size or shape including, for example, a varying outer diameter. In particular, leg 330 can include interface region 332 having a larger diameter, and taper region 334 having a variable diameter decreasing from the larger diameter of interface region 332. Any suitable approach can be used to adjust the amount of material 301 provided through die 300 to form the different regions of leg 330. In some embodiments, different portions of the die can move relative to one another. For example, pin 310 can move in direction 314 towards opening 306 to reduce the amount of material 301 flowing between die elements 302 and 304, and pin 310. This may reduce the diameter of the extruded leg. Similarly, pin 310 can move in direction 315 away from opening 306 to increase the amount of material 301 flowing between die elements 302 and 304, and pin 310. This may increase the diameter of the extruded leg. In particular, as shown in FIG. 3B, pin 310 has moved closer to opening 306 of die 300, thereby producing non-interface region 335, which has a smaller diameter than interface region 332 of leg 330.

As another example, referring back to FIG. 3A, top die element 302 and bottom die element 304 can move relative to one another to change the size of opening 306. In particular, top and bottom die elements 302 and 304 can move away each other (e.g., in directions 308*a* and 308*b*, respectively) to increase the size of opening 306. When the opening size increases, more material 301 can flow through the opening, which increases the diameter of extruded leg 330. In another case, top and bottom die elements 302 and 304 can move toward each other (e.g., in directions 309*a* and 309*b*, respectively) to decrease the size of opening 306. When the opening size decreases, less material 301 can flow through the opening, which decreases the diameter of the leg 330.

Other factors relating to the extrusion process can be adjusted to change characteristics of the die to modify the diameter of extruded leg 330. For example, the speed at which conductor 320 is fed through pin 310 and through opening 306 can be adjusted to change the diameter of leg 330. The faster the line speed of the conductor, the smaller the diameter of the resulting leg.

As another example, the speed at which a screw brings material to the die can be adjusted to control the amount of material passing through the die (e.g., adjust the RPM of the screw). As yet another example, the amount of heat provided to the barrel can control the viscosity of the material, and the pressure of the material within the barrel. As still another example, the melt pressure of the material within the barrel can be adjusted. As still yet another example, a screen and breaker plate used in the extruder can be used to control the amount of material passing from the barrel to the die. As more material passes through the die, the diameter of a resulting leg can increase.

Specific settings for the die position, line speed, heat, screw rotation speed, melt pressure, and air pressure (e.g., from cooling or for controlling the position of a die pin), which collectively can be known as system factors, can be dynamically adjusted during the extrusion process to change the diameter of an extruded leg. In particular, by dynamically adjusting system factors, an extruder can create a leg that includes an interface region, a taper or bump, and a non-interface region such that transition change between the regions is smooth and seamless. The system factors can be adjusted by any suitable component of extruder 200 such as, for example, a control station.

To ensure that an external surface of the leg created using an extrusion process as described above is smooth and the material is uniformly distributed around the conductor bundle, the conductor bundle may be covered with a sheath that maintains a constant fixed "inner" diameter within the extruded leg. Thus, while the "inner" diameter remains constant, the diameter of the extruded leg can vary.

Figure 4A:
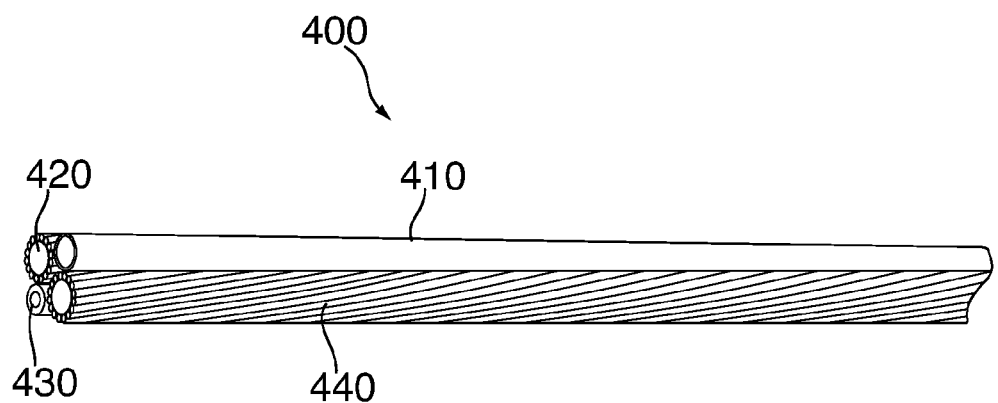
FIG. 4A is an illustrative view of a conductor bundle for use in a leg of a cable structure in accordance with some embodiments of the invention.

In addition to providing a constant "inner" diameter, the sheath covering the conductor bundle can provide a smooth outer surface over which material is extruded. In the absence of a smooth surface, material extruded over a conductor bundle can mirror or mimic discontinuities of the conductor bundle. For example, if the conductor bundle includes two distinct conductors or rods placed length-wise side by side, the outer surface of the extruded leg can include at least one indentation or discontinuity that reflects the separation between the conductors. FIG. 4A is an illustrative view of a conductor bundle for use in a leg of a cable structure in accordance with some embodiments of the invention. Conductor bundle 400 can include distinct rod 410, and conductors 420, 430 and 440 placed adjacent to each other. Rod 410 can be constructed from a superelastic material to reduce tangling of the cable structure. Conductors 420, 430 and 440 can include co-axial conductors in which several distinct conductive paths or wires are wrapped around a core. Using this approach, three conductors can be sufficient to provide six conductive paths.

Figure 4B:
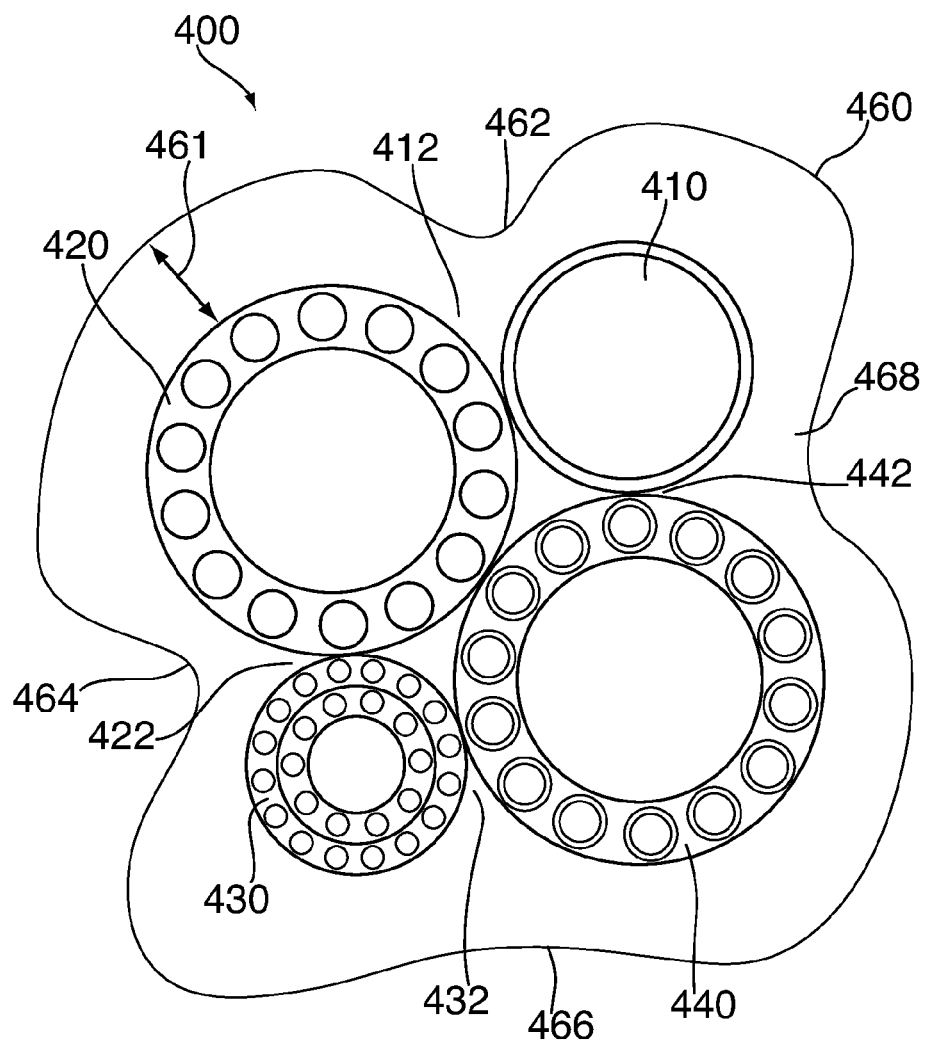
FIG. 4B is a cross-sectional view of the conductor bundle of FIG. 4A over which material is extruded in accordance with some embodiments of the invention.

Because each rod and conductor in conductor bundle 400 constitutes a separate element, there may be discontinuities between outer surfaces of the elements. FIG. 4B is a cross-sectional view of the conductor bundle of FIG. 4A in accordance with some embodiments of the invention. As shown in FIG. 4B, there may be discontinuity 412 between rod 410 and conductor 420, discontinuity 422 between conductor 420 and conductor 430, discontinuity 432 between conductor 430 and conductor 440, and discontinuity 442 between conductor 440 and rod 410. When material is extruded over conductor bundle 400, the extruded material provides a covering 460 having a constant thickness around the conductor bundle. This means, however, that variations in the outer surfaces of elements in a conductor bundle can be reflected in the outer surface of covering 460. For example, covering 460 can include discontinuity 462 corresponding to discontinuity 412, discontinuity 464 corresponding to discontinuity 422, discontinuity 466 corresponding to discontinuity 432, and discontinuity 468 corresponding to discontinuity 442. The resulting leg may lack a cosmetic appeal, and detract from a user's attraction to the cable structure.

Figure 4C:
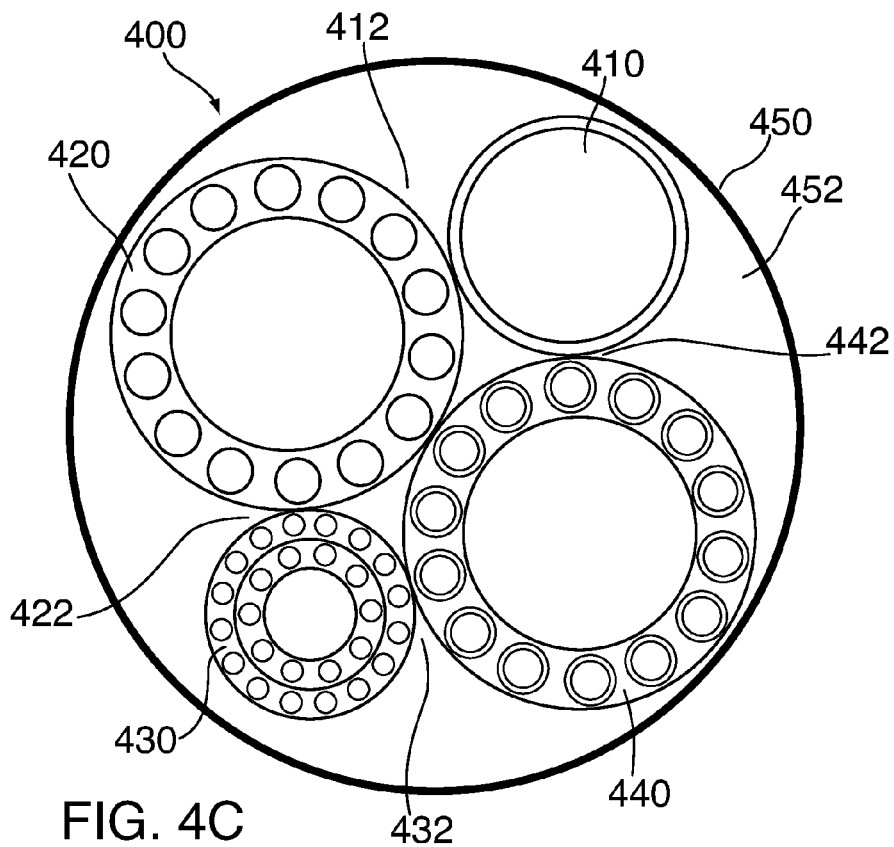
FIG. 4C is a cross-sectional view of the conductor bundle of FIG. 4A in accordance with some embodiments of the invention.

To ensure that the leg has a smooth outer surface, it may therefore be desirable for conductor bundle 400 to have a smooth outer surface. Accordingly, as shown in FIG. 4C, the rod and conductors of conductor bundle 400 can be enclosed within sheath 450. Sheath 450 can be constructed using any suitable approach including, for example, constructed as a tube into which the rod and conductors can be fed. In some embodiments, additional material 452 (e.g., a resin) can be placed between sheet 450 and the rod and conductors to fill in the discontinuities in the conductor bundle. In some cases, sheath 450 may additionally serve as an additional strain relief component within the extruded cable leg.

Figure 4D:
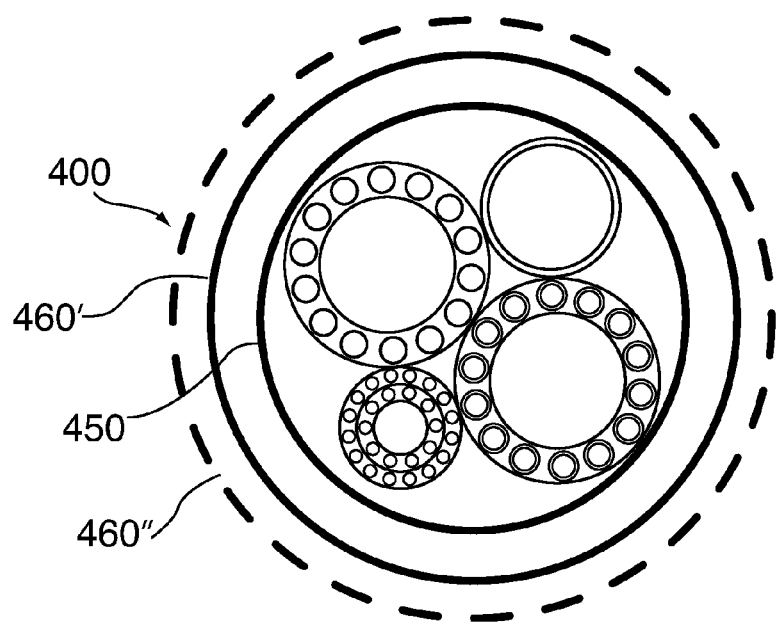
FIG. 4D is a cross-sectional view of the conductor bundle of FIG. 4A having a conductor bundle shell over which material is extruded in accordance with some embodiments of the invention.

Material can be extruded over conductor bundle 400 to create a covering that has any suitable diameter. In the example of FIG. 4D, some portions of conductor bundle 400 can be enclosed within covering 460' having a first diameter (e.g., corresponding to a non-interface region), and other portions of conductor bundle 400 can be enclosed within covering 460" having a second diameter (e.g., corresponding to an interface region). The diameter of the covering can transition between the first and second diameters in a taper region of the leg. In all regions of the leg, conductor bundle 400 can be centered relative to the covering such that an internal diameter of the covering remains constant and substantially matches sheath 500. This approach can help ensure that the outer surface of the leg remains smooth.

Figure 5:
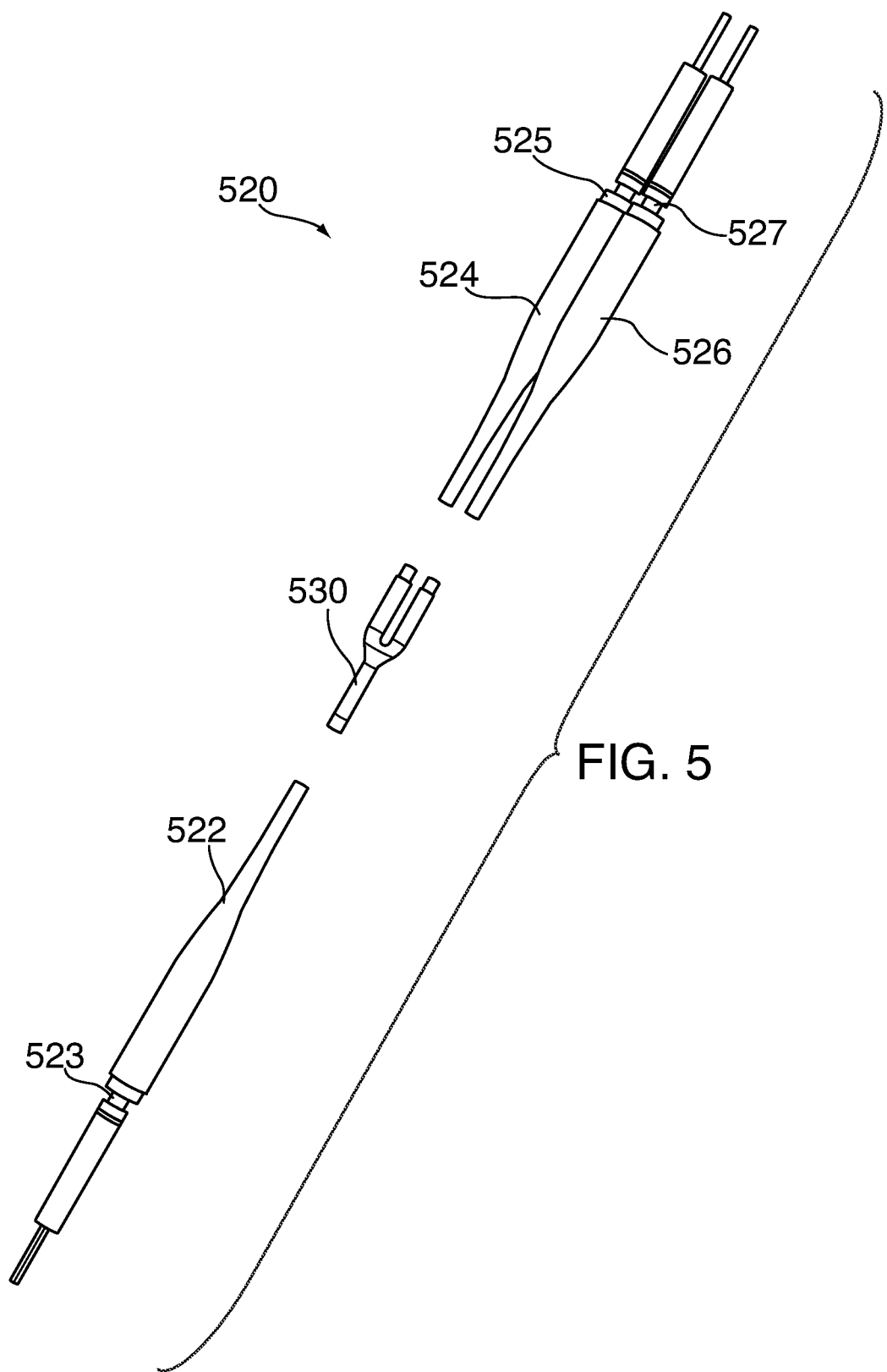
FIG. 5 is an exploded view of extruded cable legs in accordance with some embodiments of the invention.

Once each of the cable legs has been extruded, the cable legs can be assembled into a cable structure. FIG. 5 is an exploded view of extruded cable legs in accordance with some embodiments of the invention. Cable structure 520 can include main leg 522, left leg 524, right leg 526, and bifurcation region 530 having some or all of the properties of the corresponding components of cable structure 20 (FIG. 1). To complete the cable, however, one or both ends of each leg may require undercut features, or other features that cannot be constructed as part of an extrusion process. For example, main leg 522 can include undercut features 523 in an interface region. Similarly, left leg 524 can include undercut features 525 in an interface region, and right leg 526 can include undercut features 527 in an interface region. In some embodiments, one or more of the legs can instead or in addition includes undercut features near bifurcation region 530. The undercut features may be used to interface with non-cable components (e.g., an audio plug or headphone).

Figure 6:
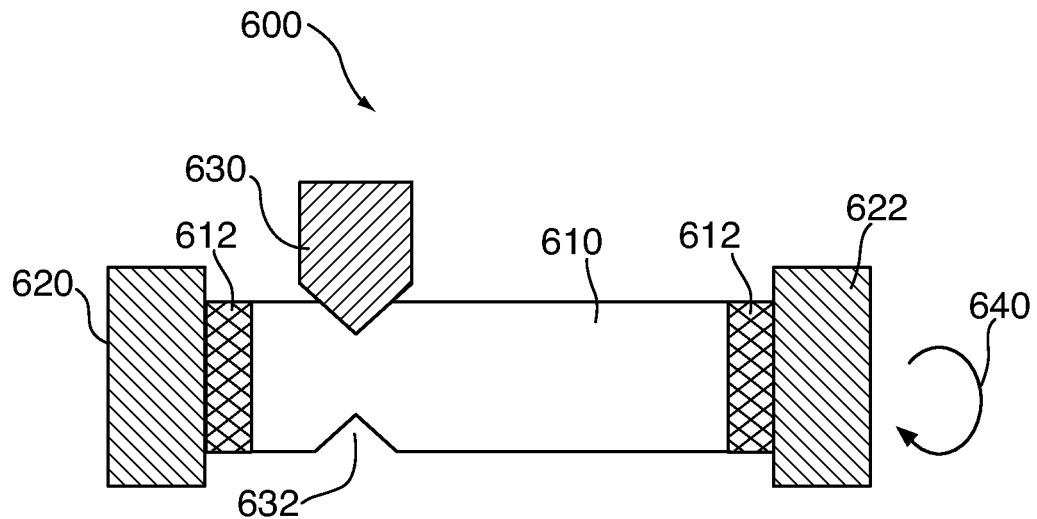
FIG. 6 is a cross-sectional view of an illustrative system used to perform a cold reform process in accordance with some embodiments of the invention.

Any suitable approach can be used to construct undercut features in extruded cable legs. In some embodiments, a cold reform process can be used. FIG. 6 is a cross-sectional view of an illustrative system used to perform a cold reform process in accordance with some embodiments of the invention. System 600 can include left fixture 620 and right fixture 622 operative to secure opposite ends of cable leg 610. Although cable leg 610 is shown as having a constant diameter, it will be understood that cable leg 610 can have a variable diameter (e.g., as described above in connection with the legs of cable structure 20, FIG. 1). Fixtures 620 and 622 can retain leg 610 in tension such that tool 630 can be applied to leg 610 to create undercuts. Fixtures 620 and 622 can be secured to any suitable portion of leg 610. In some embodiments, fixtures 620 and 622 can be coupled to excess extruded material of the leg that will be removed before completing the cable structure such as, for example, strip regions 612. Using this approach, cosmetic damage to the leg caused by fixtures 620 and 622 may be ignored, as strip regions 612 will be removed from the final product.

To create undercut features or other features within leg 610, such as feature 632, tool 630 can be applied to a surface of leg 610. Tool 630 can include any suitable tool having a cutting, grinding, or polishing element, or any other element for removing material from leg 620. In some cases, several tools 630 can be used simultaneously (e.g., two grinders are used simultaneously), or a tool can include several elements for removing material. In some embodiments, tool 630 can move relative to leg 610 to create features. For example, tool 630 can move relative to fixtures 620 and 622 and to leg 610. In particular, tool 630 can include a moving cutting element (e.g., a rotating saw) that can be brought into contact with leg 610. Alternatively, leg 610 can move relative to tool 630. For example, fixtures 620 and 622 can rotate in direction 640, such that when tool 630 is brought into contact with the leg, the rotation of the leg allows tool 630 to create undercut features. Leg 610 can rotate at any suitable speed including, for example, a speed determined from characteristics of tool 630 and from characteristics of the material used for leg 610.

The cold reform process of system 600 can be performed once an extruded cable leg has been cooled. The cable leg may in addition remain cold while tool 630 creates features in the leg. This approach can ensure that material forming leg 610 does not flow and change shape, or does not change in a manner that would adversely affect the cosmetic appearance of the leg. In addition, only the portions of leg 610 that come into contact with fixtures 620 and 622, or with tool 630 may be deformed by the process.

Figure 7:
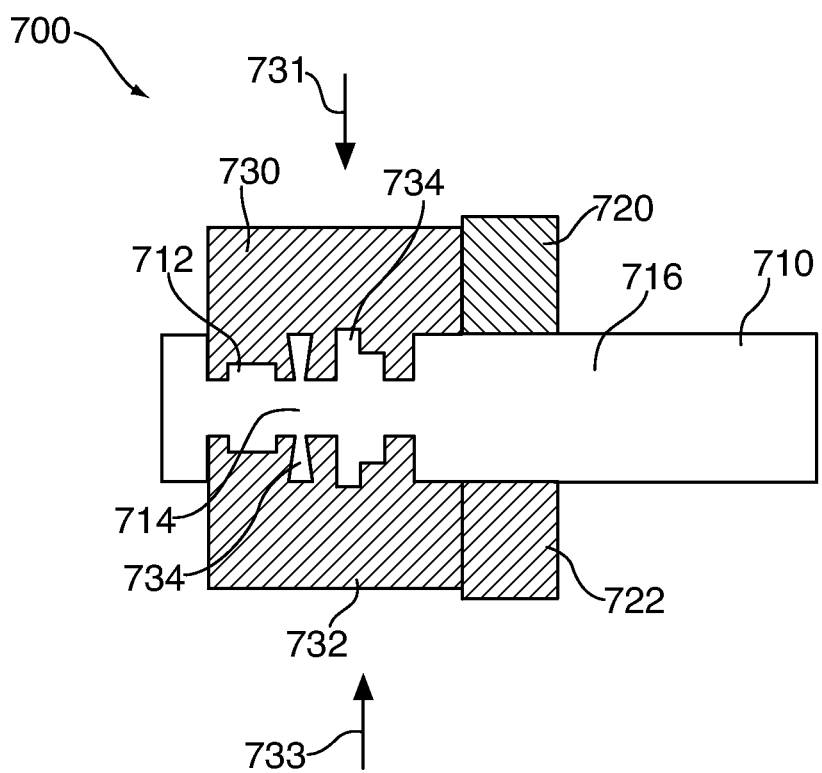
FIG. 7 is a cross-sectional view of an illustrative system for performing a hot reform process in accordance with some embodiments of the invention.

In some embodiments, a hot reform process can be used to obtain a desired undercut. FIG. 7 is a cross-sectional view of an illustrative system for performing a hot reform process in accordance with some embodiments of the invention. System 700 can be applied to extruded leg 710, which can include some or all of the features of extruded legs described above. In the example of FIG. 7, leg 710 is shown to have a constant diameter, thought it will be understood that leg 710 can have a variable diameter. Leg 710 can be secured to a fixture (not shown) to perform a hot reform process. As discussed above in connection with a cold reform process, the fixture can be placed in contact with regions of the leg that will be removed from the final product so as to avoid damaging cosmetic surfaces of leg 710.

Depending on the material used for constructing leg 710, it may be beneficial to construct undercut features in the leg using a heated tool. The heated tool can reduce the strength of the extruded material, and facilitate the formation of undercut features in the leg. System 700 can include top plate 730 and bottom plate 732 each including cutting features 734 for creating undercut features 712 in leg 710. Region 714 of leg 710, where undercut features 712 are to be provided, can be positioned between plates 730 and 732, and the plates can then be applied to the leg. In particular, top plate 730 can move in direction 731 towards leg 710, and bottom plate 732 can move in direction 733 toward leg 710. When the plates come into contact with leg 710, cutting features 734 can remove material from leg 710 to form undercut features 712.

Top and bottom plates 730 and 732 can be heated to facilitate the application of the plates to leg 710. The plates can be heated at any suitable time. In some embodiments, plates 730 and 732 can be heated before they are applied to leg 710. In other embodiments, plates 730 and 732 can be at least partially applied to leg 710 (e.g., brought into contact with the leg), and subsequently heated to create undercut features 712. Any suitable region of the plates can be heated. In one implementation, the entire plates can be heated. Alternatively, only a region that includes cutting features 734 of each plate can be heated. The plates can be heated using any suitable approach including, for example, using a heating element embedded within or in contact with a plate (e.g., a resistive heating element), or by placing the plates in contact with a heat source when they are not applied to a leg.

Because the plates are heated, heat from the plates can be conducted into regions of the leg other than region 714 where undercut features are desired. In some cases, heat can be transferred to regions of the leg that form part of the final product such as, for example, region 716. When heat is applied to region 716, the material of the leg can deform, or cosmetic properties of the material can change (e.g., the color of the material changes due to the heat). This can adversely affect the cosmetic appearance of the leg. To prevent heat from reaching region 716, system 700 can include top cold plate 720 and bottom cold plate 722 placed in contact with region 716. When heat from a hot plate reaches region 716, cold plates 720 and 722 can remove the heat from the leg before the cosmetic appearance of the leg is adversely affected. Cold plates 720 and 722 can counteract the heat imposed on leg 716 by hot plates 732 and 734. Cold plates 720 and 722 can be placed in close proximity of hot plates 730 and 732, respectively, but do not touch.

Cold plates 720 and 722 can be cooled using any suitable approach. In some embodiments, the cold plates can include an integrated cooling component. Alternatively, the cold plates can be cooled prior to being used as part of the hot reform process. In some cases, several cold plates can be used interchangeably during a hot reform process. For example, a first set of cold plates heated by the hot plates during the process can be replaced by a second set of cold plates when the first set of cold plates become too hot.

Figure 8:
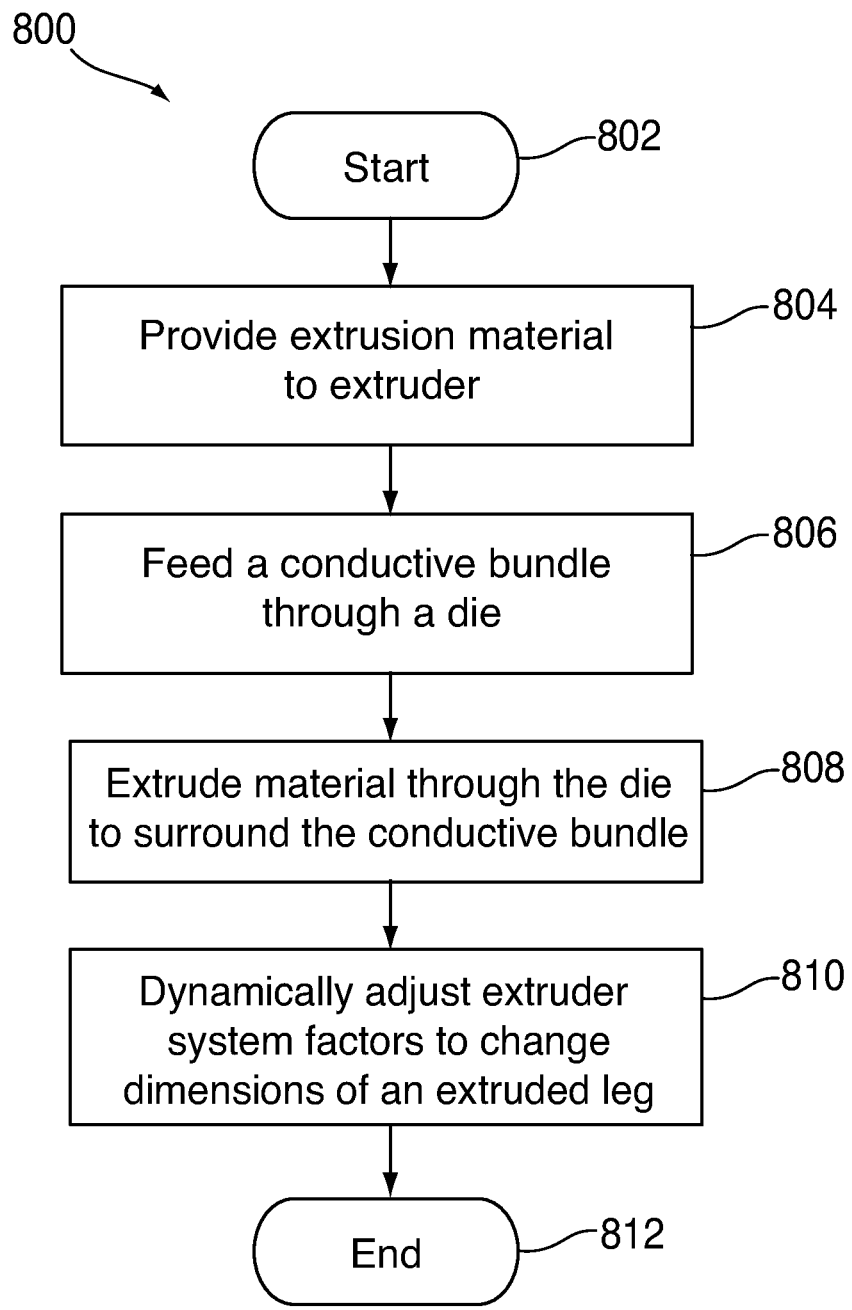
FIG. 8 is a flowchart of an illustrative process for extruding a leg of a cable structure in accordance with some embodiments of the invention.

FIG. 8 is a flowchart of an illustrative process for extruding a leg of a cable structure in accordance with some embodiments of the invention. Process 800 can begin at step 802. At step 804, material to be extruded can be provided to an extruder. For example, pellets of material can be placed in a hopper of an extruder. The extruder can melt the material, and apply pressure to the melted material so that it may be directed out of the extruder. At step 806, a conductor bundle can be fed through a die. For example, a bundle that includes conductors and a superelastic rod can be placed within a hypodermal path.

At step 808, the material can be extruded through the die to surround the conductor bundle, which is also passing through the die. The combination of the extruded material and conductor bundle form an extruded leg. At step 810, system factors of the extruder can be dynamically adjusted to change dimensions of the extruded leg. In particular, a diameter of the extruded leg can change from a large diameter in an interface region to a variable diameter defining a smooth transition from the large diameter to a small diameter of a non-interface region. Any suitable system factor can be changed including, for example, the position of die components (e.g., the position of the die pin), line speed, heat applied to the extruder, screw rotation speed, melt pressure, and air pressure, or combinations of these. Process 800 can end at step 812.

Figure 9:
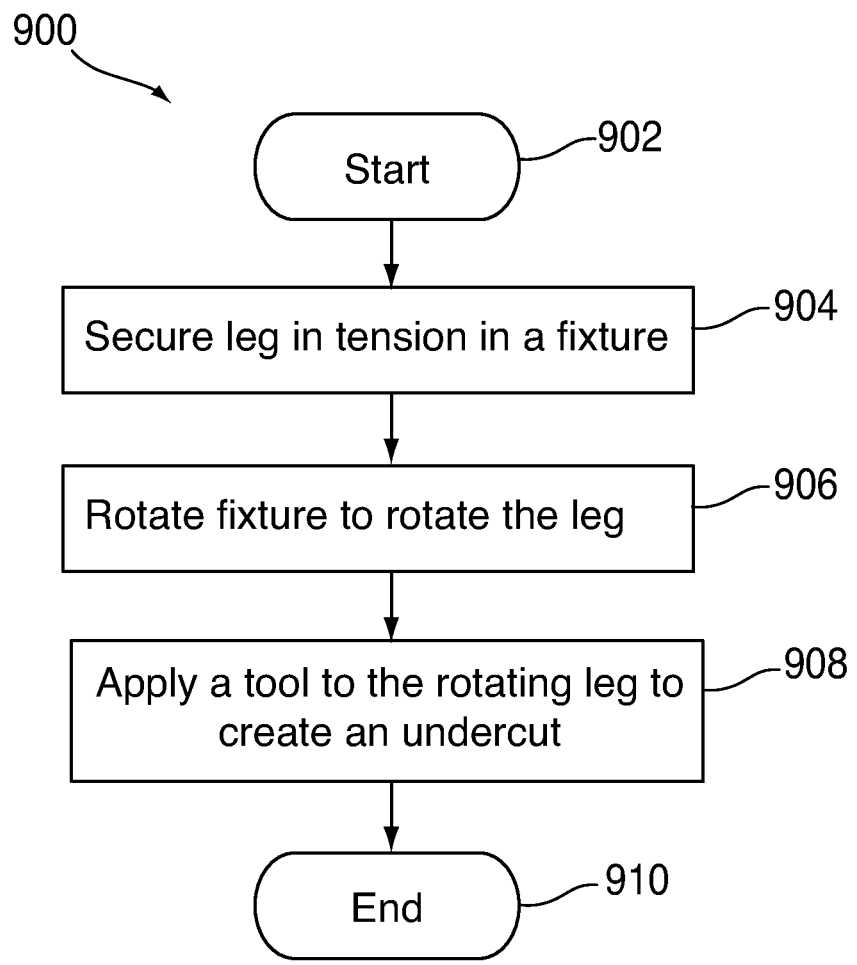
FIG. 9 is a flowchart of an illustrative process for creating an undercut in an extruded leg using a cold reform process in accordance with some embodiments of the invention.

FIG. 9 is a flowchart of an illustrative process for creating an undercut in an extruded leg using a cold reform process in accordance with some embodiments of the invention. Process 900 can begin at step 902. At step 904, an extruded leg can be secured in tension in a fixture. For example, left and right fixtures can capture opposite ends of an extruded leg, and apply tension to the leg. At step 906, the fixture can be rotated to rotate the captured leg. The leg can be rotated at any suitable speed including, for example, at a speed selected based on the material used to extrude the leg, or on the type of tool to be applied to the leg. At step 908, a tool can be applied to the rotating leg to create an undercut in the extruded material of the leg. For example, one or more grinders can be applied to the leg to create undercuts in the leg. Process 900 can then end at step 910.

Figure 10:
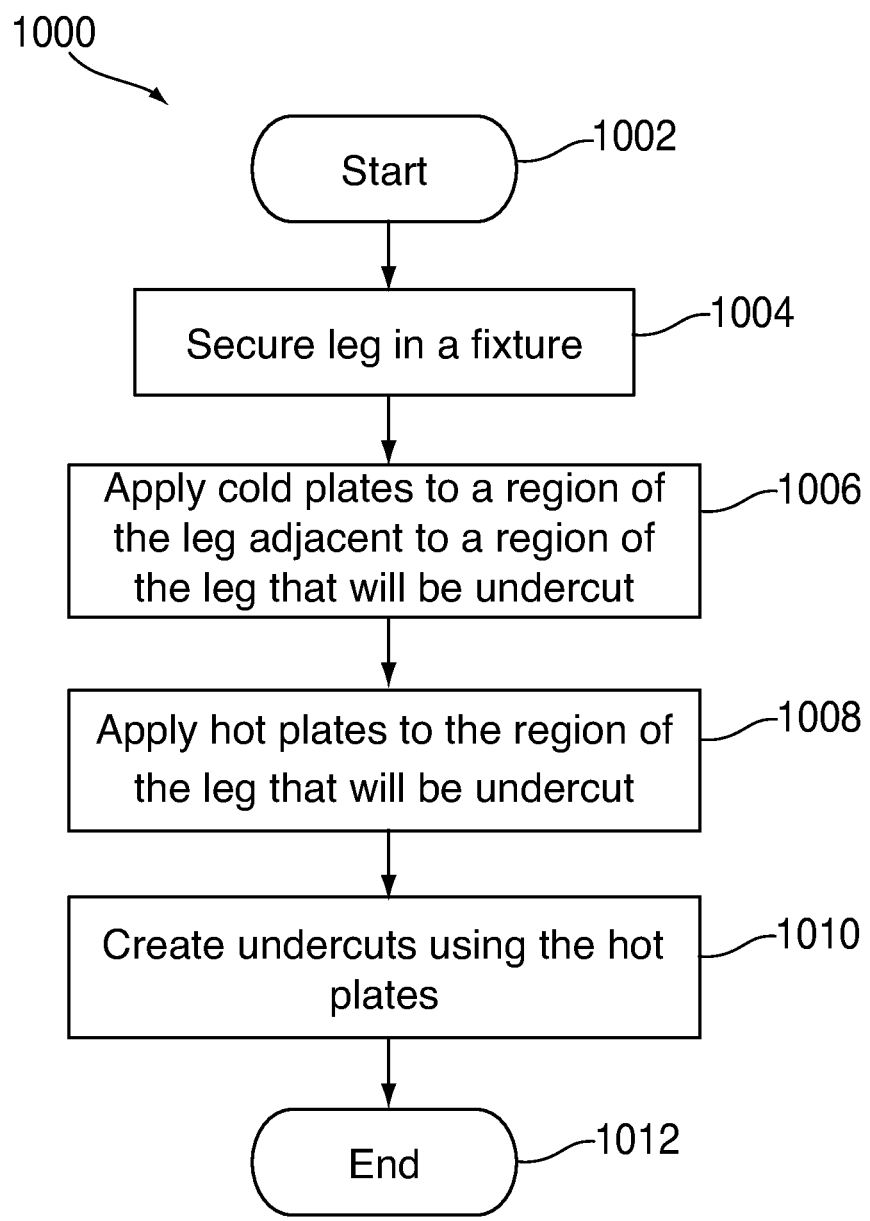
FIG. 10 is a flowchart of an illustrative process for creating an undercut in an extruded leg using a hot reform process in accordance with some embodiments of the invention.

FIG. 10 is a flowchart of an illustrative process for creating an undercut in an extruded leg using a hot reform process in accordance with some embodiments of the invention. Process 1000 can begin at step 1002. At step 1004, a leg can be secured in a fixture. At step 1006, cold plates can be applied to the region of the leg adjacent to a region of the leg that will be undercut. At step 1008, hot plates can be applied to the region of the leg that is to be undercut. At step 1010, undercuts are created using the hot plates. Process 1000 can end at step 1012.

It should be understood that processes of FIGS. 8-10 are merely illustrative. Any of the steps may be removed, modified, or combined, and any additional steps may be added, without departing from the scope of the invention.

Figure 11:
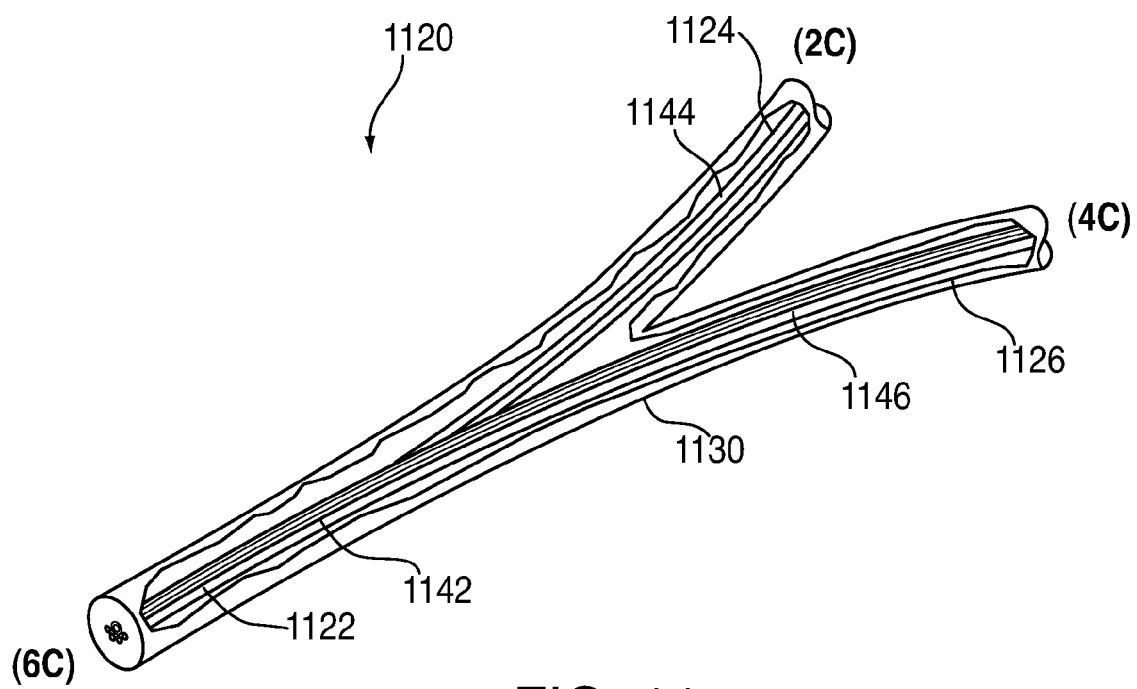
FIG. 11 is a schematic view of a bifurcation of an illustrative jointly formed multi-leg cable structure in accordance with some embodiments of the invention.

In some embodiments, the cable structure can instead by constructed as a single component having a seamless, integrated bifurcation. FIG. 11 is a schematic view of a bifurcation of an illustrative jointly formed multi-leg cable structure in accordance with some embodiments of the invention. Cable structure 1120 can include legs 1122, 1124 and 1126 joined at bifurcation 1130.

Figure 12:
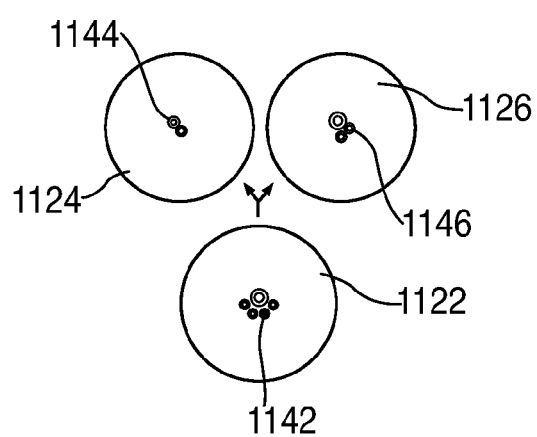
FIG. 12 is a sectional view of different conductor bundles of a multi-leg cable structure in accordance with some embodiments of the invention.

Each of cable legs 1122, 1124, and 1126 can include conductor bundles 1142, 1144, and 1146, respectively, having different numbers of conductors. For example, as shown in the cross-sections of FIG. 12, conductor bundle 1142 can include 6 conductors, which split into 2 conductors in conductor bundle 1144 and 4 conductors in conductor bundle 1146.

Figure 13A:
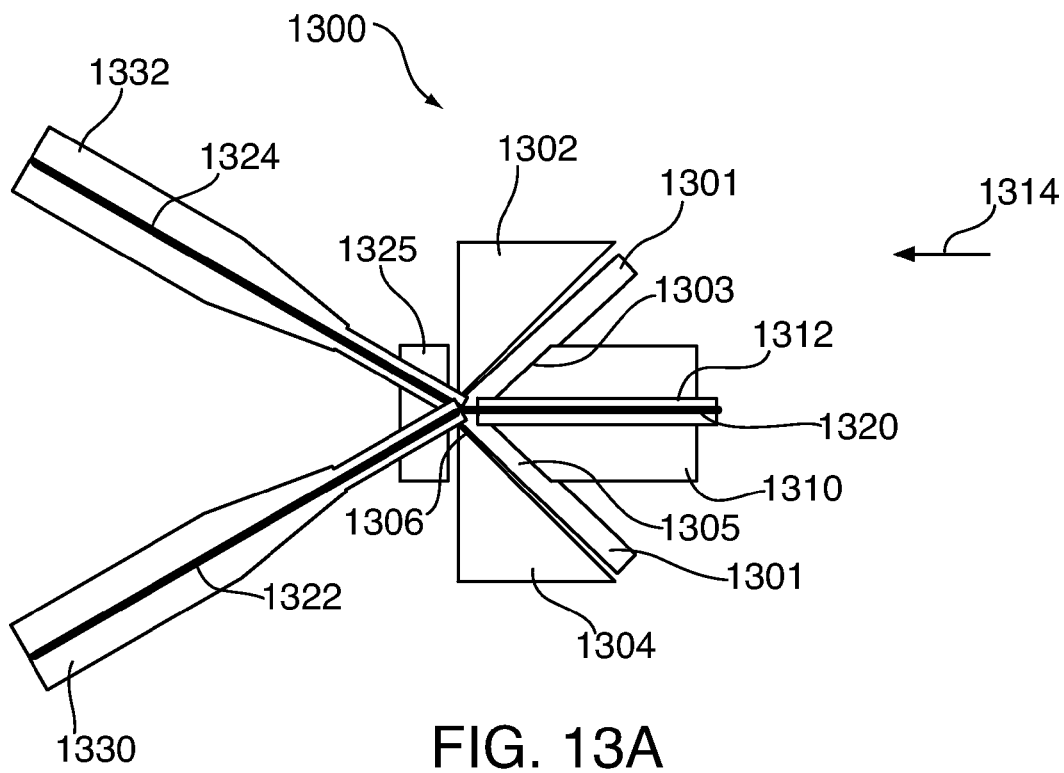
FIGS. 13A and 13B are sectional views of a portion of an illustrative extruder for providing a split in a co-extrusion process in accordance with some embodiments of the invention.
Figure 13B:
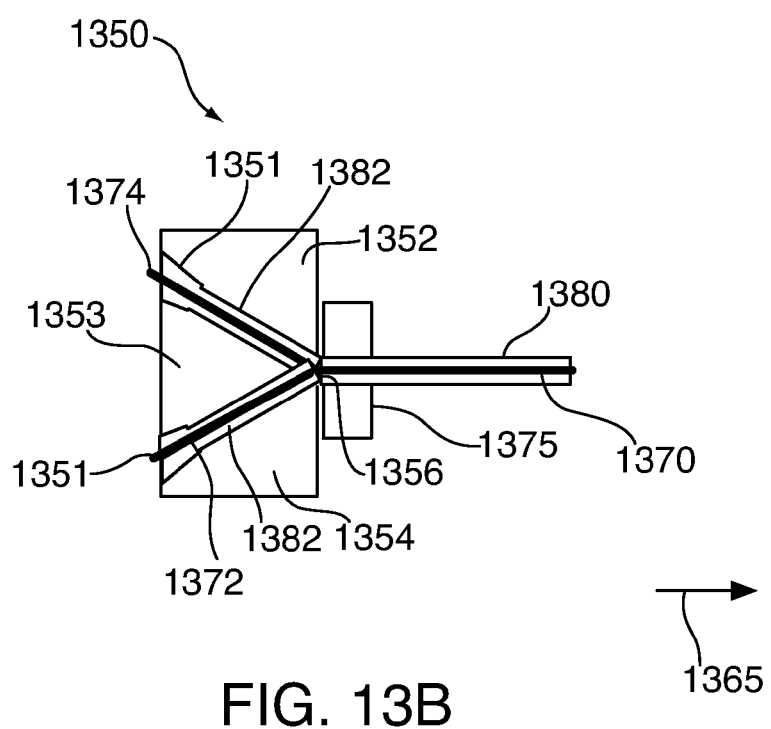

The extruder can include any suitable component for splitting an initial leg into two legs, or for combining two distinct legs into a single leg. FIGS. 13A and 13B are sectional views of a portion of an illustrative extruder for providing a split in a co-extrusion process in accordance with some embodiments of the invention. Die 1300 can include some or all of the features of die 300, described above. For example, die 1300 can include top die element 1302 and bottom die element 1304 corresponding to top and bottom halves of a cylindrical die element. Die elements 1302 and 1304 can include angled surfaces 1303 and 1305, respectively, for guiding material 1301 towards opening 1306 (e.g., when material moves in direction 1314). In some cases, the angled surfaces can correspond to surfaces of a cone removed from within die elements 1302 and 1304.

Die 1300 can include pin 1310 positioned at least partially within an area enclosed by die elements 1302 and 1304, such that angled surface 1311 corresponds to angled surfaces 1303 and 1305. In some embodiments, pin 1310 can include hypodermal path 1312 extending through pin 1310, for example extending through a centerline of pin 1310. Conductor bundle 1320 can be fed through the hypodermal path into the extrusion path (e.g., into a region between die elements 1302 and 1304 and pin 1310) and through opening 1306.

Die 1300 can include splitting member 1325 positioned adjacent to opening 1306 to separate conductor bundle 1320 into several distinct conductor bundles 1322 and 1324, corresponding to legs 1332 and 1334, respectively. As material 1301 passes through opening 1306, splitting member 1325 can redirect portions of the material into each of legs 1332 and 1334. By modifying the position of pin 1310 and splitting member 1325, the amount of material provided to each leg, and therefore the diameter of each leg, can vary. When each of legs 1332 and 1334 have been created, splitting member 1325 can be moved or repositioned to create a single leg 1320 having the conductors of both conductor bundles 1322 and 1324 (e.g., conductor bundle 1320).

In some cases, the die can instead serve to combine several distinct extruded legs into a single leg. As shown in FIG. 13B, die 1350, which can include some or all of the features of die 300, described above, can include top die element 1352, bottom die element 1354, and middle die element 1353 corresponding different surfaces of each of legs 1380 and 1382. Die elements 1352, 1353, and 1354 can include angled surfaces for guiding material 1351 towards opening 1356 (as material moves in direction 1365). In some cases, the angled surfaces can correspond to surfaces of a cone removed from within one or more of die elements 1352, 1353 and 1354.

Conductor bundles 1372 and 1374 can be fed into die 1350 with material 1301 such that initially, conductor bundles 1372 and 1374 combine and form conductor bundle 1370. Material 1351, fed through die 1350, creates leg 1380. Die 1350 can include splitting member 1375 which, when positioned in die 1350, maintains conductor bundles 1372 and 1374 separate to create legs 1382 and 1384. Then, as material is provided in direction 1365, leg 1380 can be initially created, and subsequently split, at a bifurcation created by splitting member 1375, into legs 1382 and 1384. By modifying the position of splitting member 1375, the amount of material provided to each leg, and therefore the diameter of each leg, can vary.

Manufacturing a jointly formed multi-leg cable structure via an extrusion process can provide several advantages. For example, the extrusion process can provide a continuous and smooth structure that is aesthetically pleasing. In addition, the cable structure may have no discontinuities creating areas in which stresses can be concentrated. This may eliminate a need for an overmold or other strain relief component (e.g., an interface with a non-interface component).

The described embodiments of the invention are presented for the purpose of illustration and not of limitation.

What is claimed is:

1. A method for constructing a cable structure, the method comprising:
   providing material to an extruder, the extruder comprising:
      a movable pin;
      a die through which the material is extruded;
   feeding a first conductor bundle through a hypodermic path within the movable pin and extending through a portion of the die;
   moving the movable pin to at least partially define the volume of the material extruded through the die;
   extruding the material through the die while the conductor bundle is fed through the hypodermic path, wherein the extruded material surrounds the conductor bundle to form a first leg;
   splitting, by a splitting member, the first conductor bundle and leg into at least a second and third conductor bundle defining a second and third leg; and
   dynamically adjusting, for each of the second and third legs, system factors of the extruder and the splitting member to change an outer diameter of the respective leg in a bump region of the respective leg that separates an interface region of the respective leg from a non-interface region of the respective leg.

2. The method of claim 1, wherein the system factors comprise at least one of:
   a line speed;
   heat;
   a screw rotation speed;
   a melt pressure; and
   an air pressure.

3. The method of claim 1, wherein:
   one or more of the first, second, and third conductor bundles comprises a rod of superelastic material extending length-wise with at least one conductor.

4. The method of claim 1, wherein the first conductor bundle comprises a sheath having a smooth outer surface.

5. The method of claim 1, wherein for each leg:
   the non-interface region comprises a first diameter corresponding to a first setting of the system factors;
   the interface region comprises a second diameter corresponding to a second setting of the system factors; and
   the bump region comprises a diameter that varies between the first diameter and the second diameter.

6. The method of claim 5, wherein for each leg:
   a transition between the non-interface region and the bump region is smooth.

7. The method of claim 5, wherein for each leg:
   a transition between the interface region and the bump region is smooth.

8. A method for constructing a cable structure comprising a first leg, a second leg, and a third leg coupled together at a bifurcation region, comprising:
   co-extruding a first conductor bundle with material to create the first leg, wherein the first leg comprises a non-interface region and an interface region each having different diameters, and a bump region providing a smooth transition between the non-interface region and the interface region;
   splitting a second and third conductor bundle from the first conductor bundle to define the bifurcation region of the cable structure;
   co-extruding the second conductor bundle with material to create the second leg, wherein the second leg comprises a non-interface region and an interface region each having different diameters, and a bump region providing a smooth transition between the non-interface region and the interface region; and co-extruding the third conductor bundle with material to create the third leg, wherein the third leg comprises a non-interface region and an interface region each having different diameters, and a bump region providing a smooth transition between the non-interface region and the interface region.

9. The method of claim 8, further comprising:

coupling a first non-cable component to the non-interface region of the first leg;

coupling a second non-cable component to the non-interface region of the second leg; and coupling a third non-cable component to the non-interface region of the third leg.

10. The method of claim 8, further comprising:

varying a diameter of the bump region between a diameter of the non-interface region and a diameter of the interface region.

11. The method of claim 8, wherein:

a diameter of the non-interface region is smaller than a diameter of the interface region.

\* \* \* \* \*